(12) United States Patent
Kaster et al.

(10) Patent No.: US 7,044,070 B2
(45) Date of Patent: May 16, 2006

(54) SEED DRILL WITH WALKING BEAM ASSEMBLY

(75) Inventors: P. Philip Kaster, Shelbyville, IN (US); Craig A. Kaster, Westfield, IN (US)

(73) Assignee: Kasco Manufacturing Company, Inc., Shelbyville, IN (US)

( * ) Notice: Subject to any disclaimer, the term of this patent is extended or adjusted under 35 U.S.C. 154(b) by 191 days.

(21) Appl. No.: 10/772,609

(22) Filed: Feb. 5, 2004

(65) Prior Publication Data

US 2005/0172872 A1    Aug. 11, 2005

(51) Int. Cl.
*A01C 5/00* (2006.01)
*A01C 7/18* (2006.01)
*A01B 15/00* (2006.01)

(52) U.S. Cl. .......................... 111/62; 172/763; 172/773
(58) Field of Classification Search .................. 111/52, 111/54, 55, 62, 136, 167; 172/763, 773
See application file for complete search history.

(56) References Cited

U.S. PATENT DOCUMENTS

| | | | | |
|---|---|---|---|---|
| 552,329 | A * | 12/1895 | Packham | 368/300 |
| 1,021,379 | A * | 3/1912 | Schutt | 111/54 |
| 1,392,732 | A * | 10/1921 | Zarmstorf | 172/394 |
| 4,116,140 | A * | 9/1978 | Anderson et al. | 111/136 |
| 4,273,057 | A * | 6/1981 | Pollard | 111/164 |
| 4,333,534 | A | 6/1982 | Swanson et al. | |
| 4,407,207 | A * | 10/1983 | Dreyer | 111/136 |
| 4,450,779 | A | 5/1984 | Bailey | |
| 4,539,921 | A | 9/1985 | Morlock | |
| 4,964,351 | A * | 10/1990 | Elmenhorst | 111/140 |
| 5,065,681 | A | 11/1991 | Hadley | |
| 5,398,771 | A | 3/1995 | Hornung et al. | |
| 5,507,351 | A * | 4/1996 | Martin | 172/558 |
| 5,595,130 | A | 1/1997 | Baugher et al. | |
| 6,640,732 | B1 * | 11/2003 | Prairie et al. | 111/167 |
| 2003/0164125 | A1 * | 9/2003 | Paluch et al. | 111/56 |
| 2005/0120929 | A1 * | 6/2005 | Friesen et al. | 111/62 |

OTHER PUBLICATIONS

"The Eco-Drill—Kasco Innovation . . . Kasco Value . . . ", Kasco Manufacturing Co., Inc., 2001.

* cited by examiner

*Primary Examiner*—Thomas B. Will
*Assistant Examiner*—Julianne Cozad
(74) *Attorney, Agent, or Firm*—Woodard, Emhardt, Moriarty, McNett & Henry LLP (57) ABSTRACT

A no-till drill with a novel walking beam assembly that allows the drill to be pulled over severe terrain conditions that include large rocks, fallen limbs and other large obstructions. The inventive walking beam assembly includes two independent pivot points that allow the cutting and opening disks to maintain substantially constant or continuous contact with the ground, such that the length of the furrow formed and seed deposited therein are maximized. A closing disk assembly is suspended from the rear of the drill independently from the walking beam assembly. This independent suspension allows the walking beam assembly to function without interference from the closing disks.

8 Claims, 12 Drawing Sheets

SEED DRILL WITH WALKING BEAM ASSEMBLY

FIELD OF THE INVENTION

The present invention relates generally to seed drills that form a trench or furrow in the ground and deposit seed therein, and more particularly, to seed drills that are used in unconventional soils and terrain.

BACKGROUND OF THE INVENTION

Soil conditions for planting can be divided into three categories. "Conventional till" soil is formed by working the soil into a garden-like condition before planting. Conventional till is loose and crumbly and has little intact plant residue, sometimes called "trash," present on the surface. A second category is "minimum till soil," in which the soil is only lightly tilled prior to planting. Minimum till is generally firmer than conventional till, and some intact plant residue is present when the crop is planted.

The third category is "no till," which refers to soil that remains largely undisturbed from its natural condition. In no-till conditions, crop is planted among standing weeds, remaining plant root structure, and other trash. In the 1960s, no-till agriculture was not widely supported among farmers and agriculture specialists in the United States, but has since been embraced by farmers worldwide. It is now generally recognized that no-till provides certain advantages over conventional till, namely, less work, better moisture and nutrient preservation, less chemical loss and redistribution, less erosion and other benefits. These advantages are believed due largely to less disruption or working of the soil in no-till as compared to conventional till.

No-till planting is most commonly used in applications where a no-till drill is used to plant seed on a conventional farming plot in which the remainder of the previous year's crop is left intact, resulting in the type of "trash" described above. This trash is generally predictable and consistent throughout the farming plot, and many commercially available no till drills can effectively plant seed on such a plot.

However, now that no-till planting has been proven as an effective planting method, new applications for it have arisen. One such application that is growing in popularity is seeding wildlife plots, which may be located, for example, next to or within a forest or wooded area. Of course, unlike smooth and open rolling pastures and other conventional farming plots, wildlife plots can be fraught with severely uneven terrain, large rocks, fallen limbs, large weeds and other debris. These obstructions are of a much larger scale and unpredictability than those encountered in typical no-till applications, and they pose new challenges for no-till equipment.

SUMMARY OF THE INVENTION

The present invention provides a no-till drill with a novel walking beam assembly that allows the drill to be pulled over severe terrain conditions that include large rocks, fallen limbs and other large obstructions. The walking beam assembly includes two independent pivot points that allow the cutting and opening disks to maintain substantially constant or continuous contact with the ground, such that the length of the furrow formed and seed deposited therein are maximized.

In one form thereof, the present invention provides a seed drill having a frame. A walking beam is suspended from the frame and is pivotable about a first pivot point. A spring member connects the walking beam to the frame and movably biases the walking beam downward relative to the frame. A first disk and a second disk are rotatably mounted to opposite ends of the walking beam, are positioned adjacent one another, and are positioned on opposite sides of the first pivot point.

In a preferred form, the seed drill includes an arm member having a first portion pivotably attached to the walking beam at the first pivot point and a second portion pivotably attached to the frame at a second pivot point. In use, pivotal movement of the walking beam about the first pivot point causes upward movement of one of the first and second disks and downward movement of the other of the first and second disks relative to the first pivot point. Further, pivotal movement of the arm member about the second pivot point causes vertical displacement of the walking beam relative to the frame. The inventive walking beam thus provides two independent pivot points.

More preferably, the seed drill also includes a closing disk assembly independently suspended from the frame by a closing disk suspension. Advantageously, by independently suspending the closing disk assembly, its interference with the walking beam assembly is eliminated. Thus, the walking beam can cross extremely uneven terrain or large obstructions, yet both disks mounted to it maintain contact with the ground and perform their functions. Maximizing the contact of the disks with the ground of course in turn maximizes the length of furrow formed and seed planted, which further in turn maximizes the ultimate yield of crop.

In preferred embodiments, a cutting disk and an opening disk are rotatably mounted to the walking beam. Since the opening disk performs more work in terms of the amount of ground it moves, more force must be applied to it than the cutting disk. The inventors of the present invention have discovered that more force can be applied to the opening disk by applying downward force from the frame to the walking beam at a point that is offset from the center of the walking beam and is instead closer to the opening disk than the cutting disk.

In another form thereof, the present invention provides a novel method of forming a furrow in uneven terrain. In this inventive method, a walking beam is provided that includes a first disk and a second disk rotatably mounted to opposite ends thereof. The walking beam is aligned along a direction of travel and moved forwardly over the uneven terrain while allowing the uneven terrain to pivot the walking beam about a pivot point located between the first and second disks. Meanwhile, downward force is applied to the walking beam at the pivot point, which maintains both the first disk and second disk in substantially constant contact with the uneven terrain, thereby forming the furrow.

Advantageously, the inventive drill of the present invention provides a solution for seeding wildlife plots, pasture renovations, waterway seeding, roadside grass overseeding and many other applications.

BRIEF DESCRIPTION OF THE DRAWINGS

The above-mentioned and other advantages of the present invention, and the manner of obtaining them, will become more apparent and the invention itself will be better understood by reference to the following description of the embodiments of the invention taken in conjunction with the accompanying drawings, wherein.

Corresponding reference characters indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The no-till drill (also referred to herein as "seed drill" and "drill") in accordance with the present invention includes an inventive walking beam assembly that allows the drill to be pulled over severe terrain conditions that include large rocks, fallen limbs and other large obstructions, such as those encountered in wildlife plots that are located next to or in wooded areas. The novel walking beam assembly includes two independent pivot points that allow the cutting and opening disks to maintain substantially constant or continuous contact with the ground even when crossing the severe obstructions and uneven terrain just noted. Advantageously, this allows the inventive drill to form a furrow and deposit seed into it in extreme terrain conditions.

Figure 1:
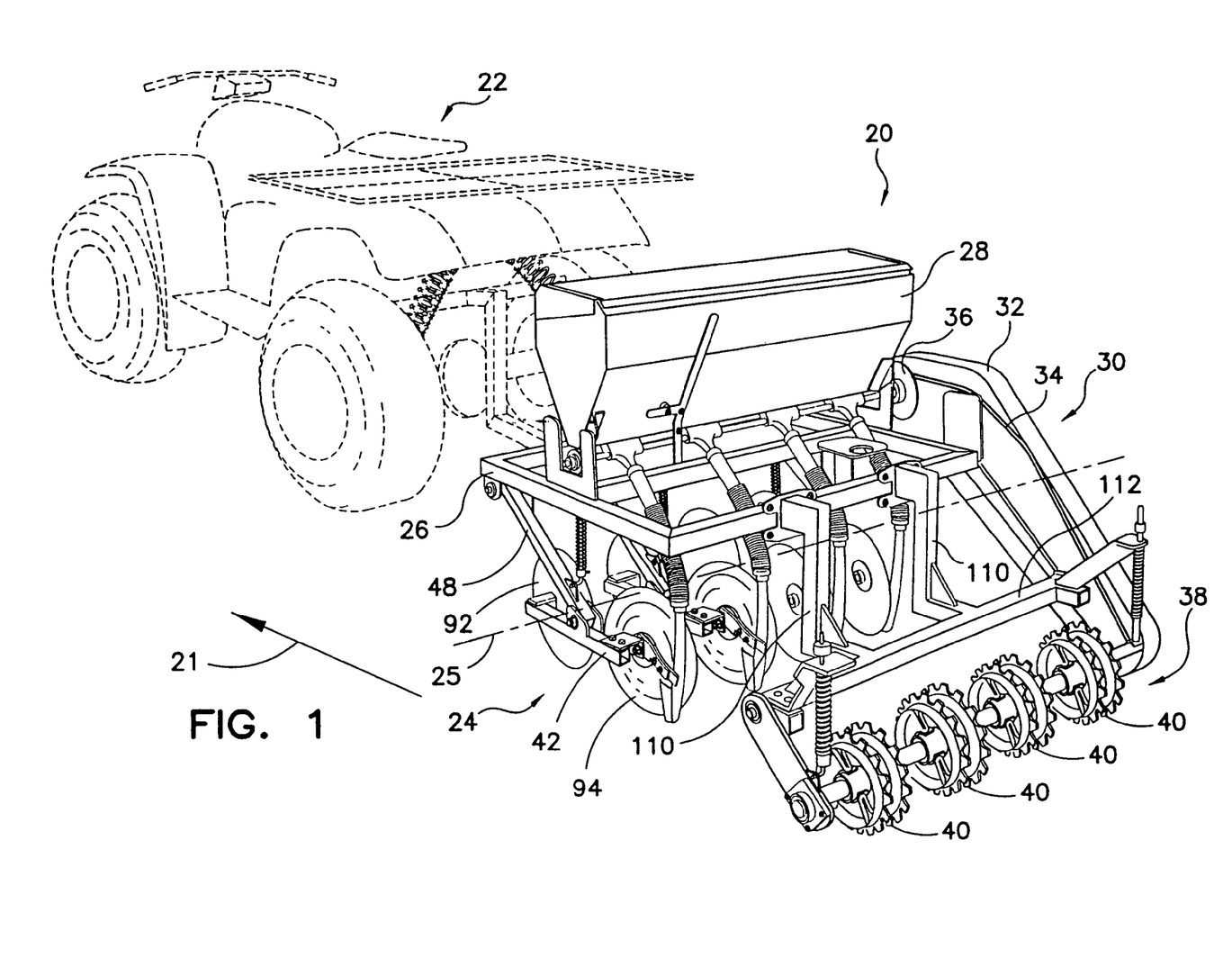
FIG. 1 is a perspective view of a no-till drill in accordance with one embodiment of the present invention, illustrated with an all terrain vehicle ("ATV") in phantom pulling the no-till drill.

Turning to FIG. 1, drill 20 includes walking beam assembly 24 mounted to frame 26, which is shown in the illustrated embodiment as a rectangular piece of angled steel to which the components of drill 20 are mounted. Also mounted to frame 26 is seed hopper 28, which includes a rotating seed metering system (not shown) that is driven by drive train assembly 30. Drive train assembly 30 is protected by shroud 32, under which is disposed a drive chain 34 connecting seed hopper sprocket 36 to another sprocket (not shown) located near closing disk assembly 38. As the ground causes closing disks 40 to rotate, the drive chain 34 is driven and causes the seed metering system in the hopper to rotate. Seed hopper 28 and drive train assembly 30 as illustrated herein are known in the art and need not be disclosed in further detail herein.

Figure 2:
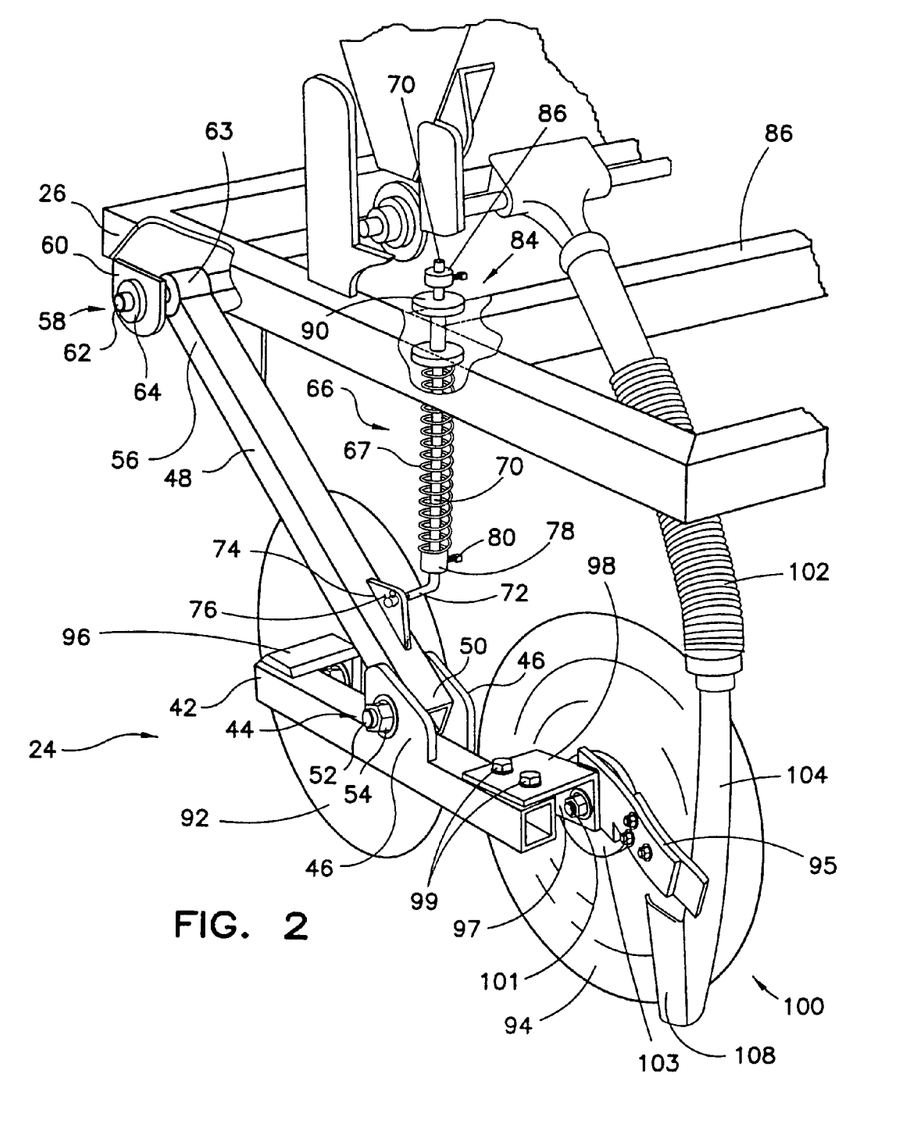
FIG. 2 is an enlarged fragmentary perspective view illustrating the walking beam assembly of the no-till drill shown in FIG. 1.
Figure 4:
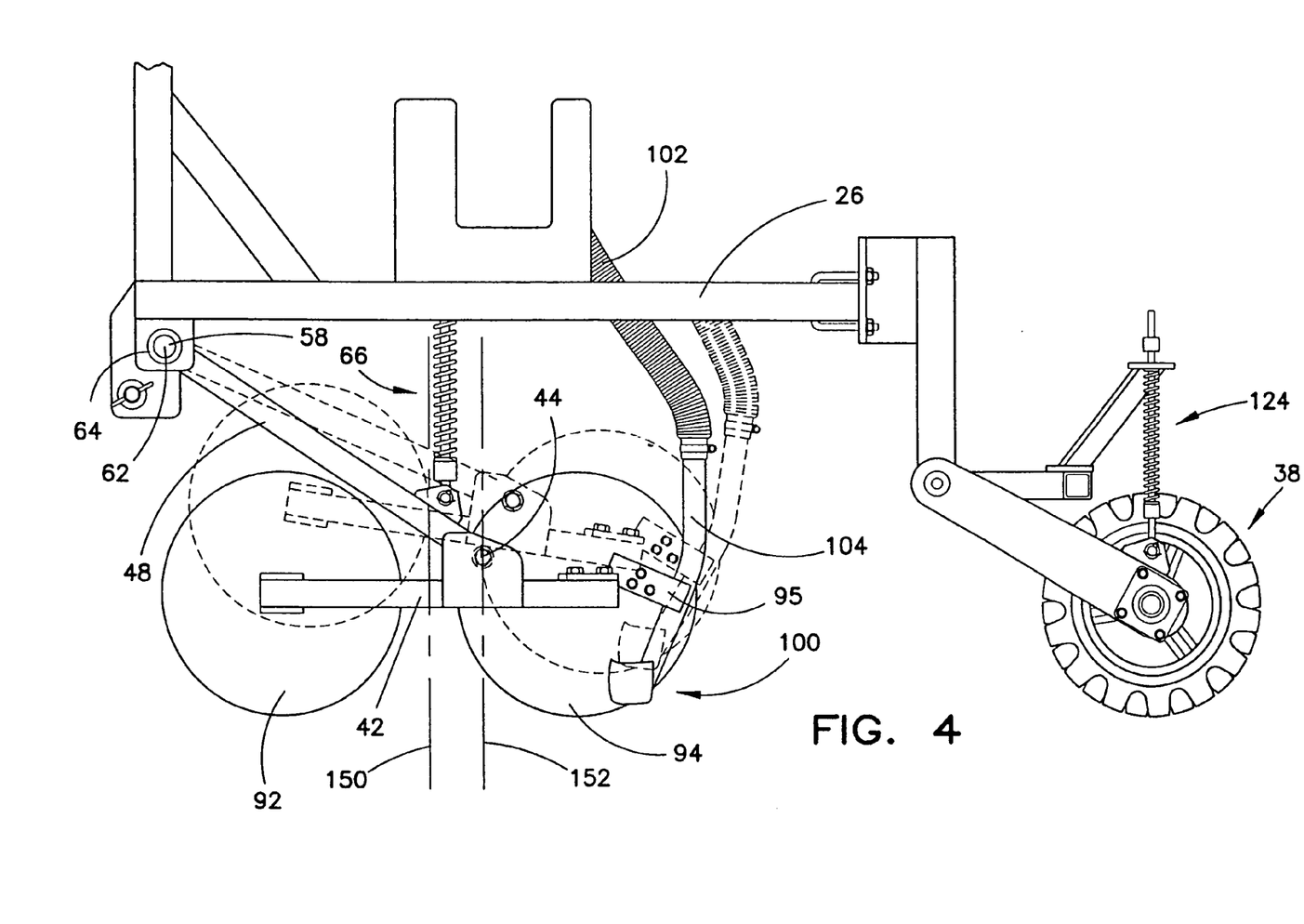
FIG. 4 is a side view of the walking beam assembly and closing disk assembly of the no-till drill of FIG. 1, displacement of the walking beam assembly being shown in phantom.

Referring to FIGS. 1, 2 and 4, a walking beam 42 is suspended from frame 26 and is pivotable about pivot point 44. Walking beam 42 in the illustrated embodiment is a unitary, elongated, rectangular and hollow steel member having two upwardly extending ears or tabs 46 that facilitate connection to arm member 48 (also see FIG. 5). Tabs 46 can be integrally formed with or affixed to walking beam 42 by welding, brazing, fasteners or any number of suitable attachment means. It should also be understood that other means of pivotably connecting arm member 48 to walking beam 42, e.g., hinges, could be used. Arm member 48 is made from the same or similar stock as walking beam 42, and has a first end portion 50 pivotably attached to walking beam 42 at pivot point 44. Bolt 52 fits through two corresponding holes in tabs 46 and in two holes (not shown) in arm member 48. Nut 54 secures the pivotable connection between arm member 48 and walking beam 42.

Figure 6A:
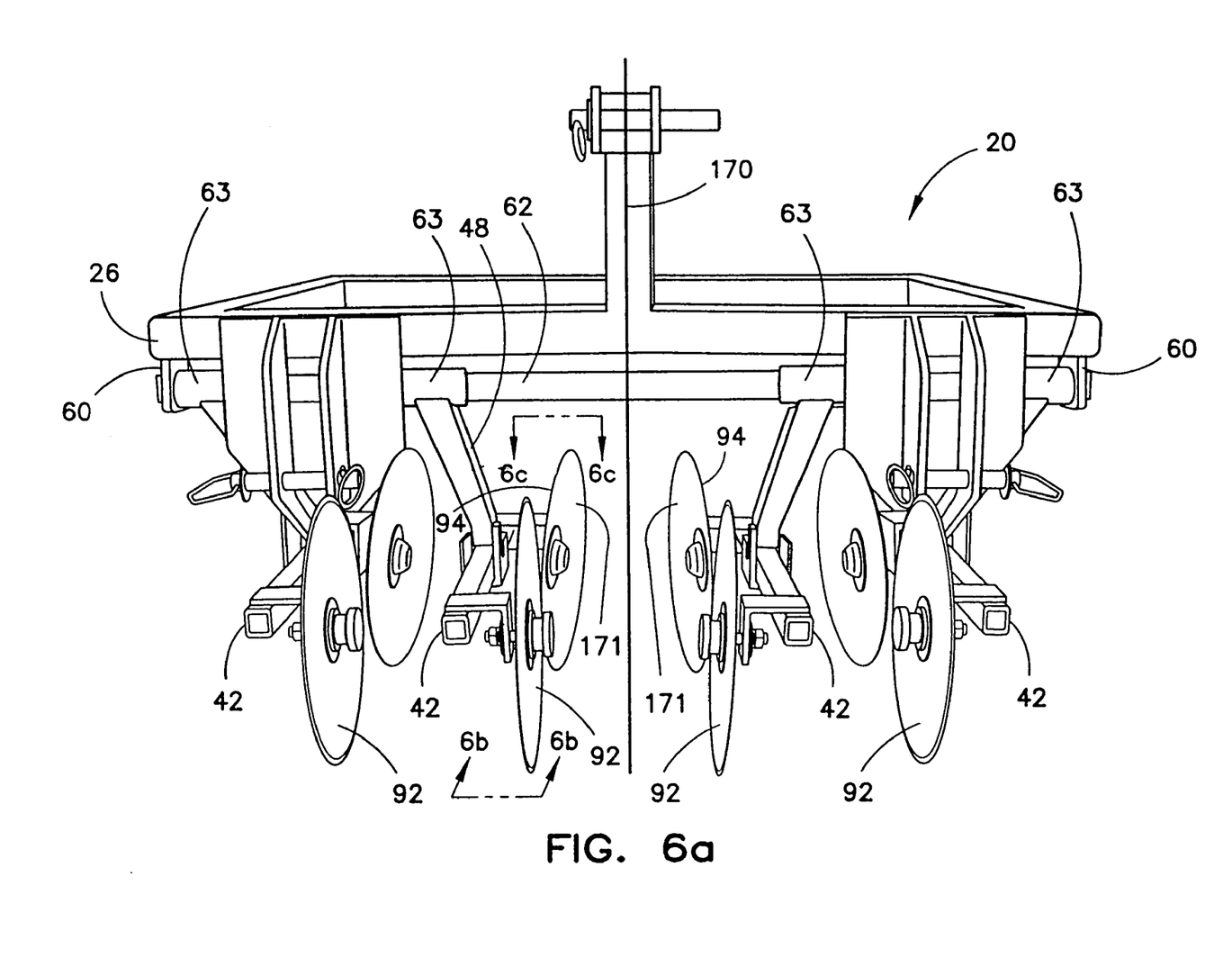
FIG. 6a is a perspective view taken from the front of the no-till drill that illustrates the orientation of the cutting and opening disks relative to a central axis of the drill.

Arm member 48 has another end portion 56 pivotably attached to frame 26 at pivot point 58. More particularly, frame 26 includes tab 60 having a bushing 64 that supports bar 62, which extends across drill 20 (also see FIG. 6a). As shown in FIG. 2, arm member 48 terminates in a cylindrical sleeve 63 that is rotatably mounted on bar 62, which allows arm member 48 to pivot about pivot point 58. As shown in FIG. 6a, the same arm member/sleeve arrangement is employed for the other walking beam assemblies that are suspended from frame 26. One of ordinary skill in the art would readily recognize other means for pivotably attaching arm member 48 to frame 26.

Figure 2A:
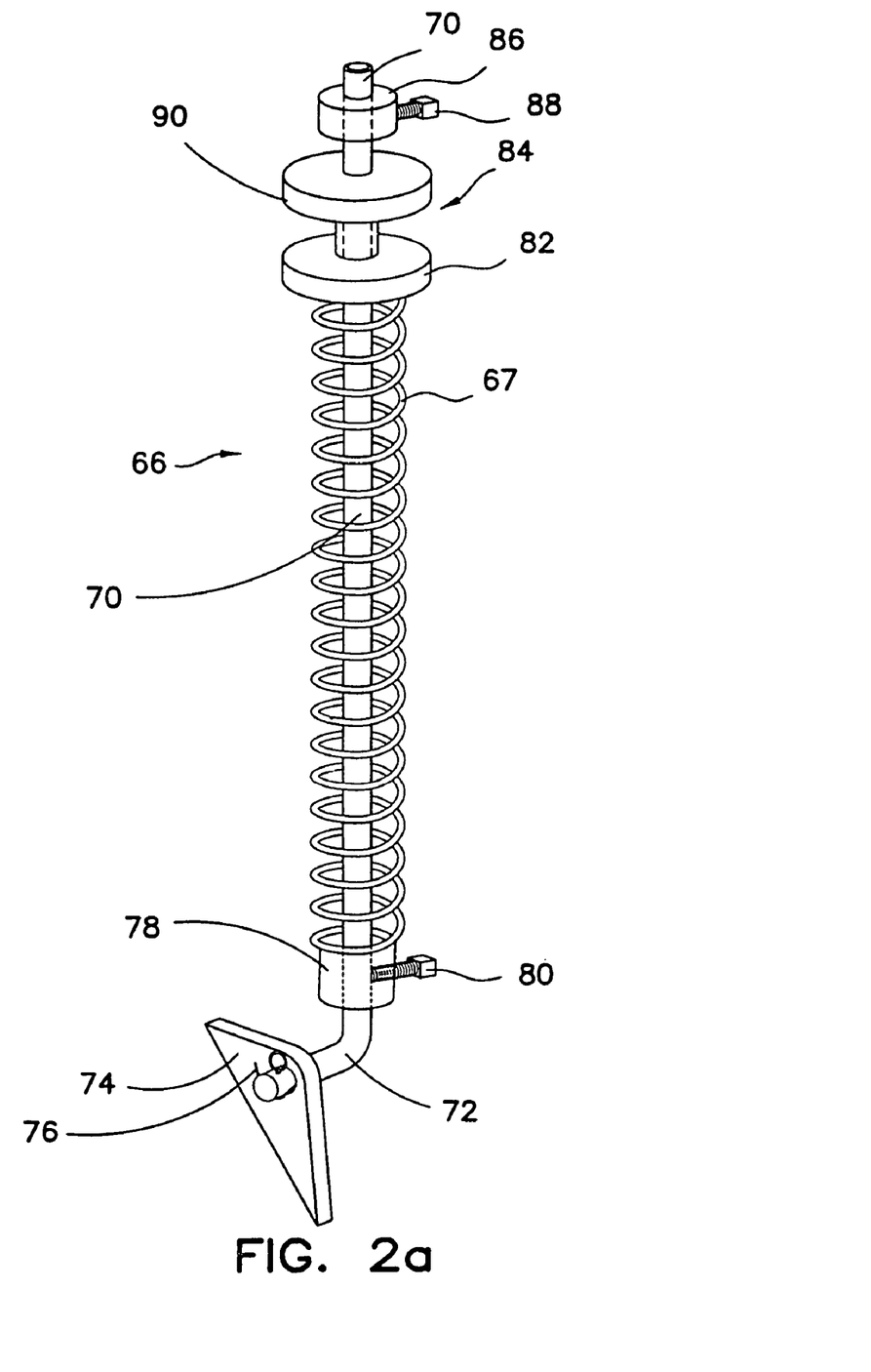
FIG. 2a is an enlarged view of a spring member shown in FIG. 2.

As shown in FIG. 2 and in more detail in FIG. 2a, a spring member 66 has its top end connected to frame 26 and its bottom end connected to arm member 48. Spring member 66 includes a rod member 70 that is fed through spring 67. Rod 70 is made of cylindrical steel stock and has an angled end 72 that is received through a hole formed in tab 74. End 72 is secured by a cotter pin 76 as shown. The bottom end of spring 67 abuts against moveable sleeve or collar 78. Collar 78 has a threaded opening that threadingly receives a set screw 80 whose end presses against and engages rod 70 when tightened, thereby holding collar 78 in place vertically with respect to rod 70. The tension in spring member 66 is increased by loosening screw 80, moving collar 78 upward with respect to rod member 70, and then re-tightening screw 80. This increases the downward force on arm member 48 and in turn walking beam 42. In this manner, spring member 66 movably biases walking beam 42 downward relative to the frame 26, as explained in further detail below.

As further shown in FIG. 2a, spring 67 abuts and is biased against flange 82 of bushing 84, which is affixed to crossmember 86 of frame 26 by welding or other suitable means. Rod member 70 is reciprocably received in bushing 84. The upward vertical displacement of rod member 70 (and thus walking beam 42), such as when covering uneven terrain, is limited by the tension in spring 67. As described above, the tension in spring 67 can be adjusted by moving collar 78. The downward displacement of rod member 70 is limited by the position of movable collar 86 on rod member 70, which position is adjustable by loosening set screw 88, sliding collar 86 to the desired position and then re-tightening screw 88. As rod member 70 displaces downward with respect to bushing 84, the maximum displacement occurs when collar 86 abuts flange 90 of bushing 84. During operation over uneven terain, spring 67 compresses against the bottom of flange 82 and collar 86 may "float" above flange 90 or be biased against it, depending upon the terrain and the position of drill 20 relative thereto. For example, as the closing disks (also called cultipacker wheels) 40 travel over a "high spot"

in the terrain and are thus biased upwardly by the ground, collar 86 may move toward and rest against flange 90. The depth the disks will cut into the ground is adjusted by adjusting the position of collars 86 and 78. At rest, collar 86 is normally biased against flange 90 by spring 67 and therefore acts as a depth adjustment. The higher relative to rod 70 that collar 86 is positioned, the deeper is the furrow that is cut with the disks, as described below. Similarly, the placement of collar 78 can affect depth by increasing or decreasing the downward force exerted on the ground by the disks. When the walking beam assembly 24 encounters a hill or bump, collar 86 can displace upward and away from flange 90. Collars 86 and 78 are typically moved up or down together by the same amount to control the depth to which the opener disks 94 cut. For example, if a deeper cut is desired, collars 78 and 86 will be adjusted upward by about the same amount.

Figure 4A:
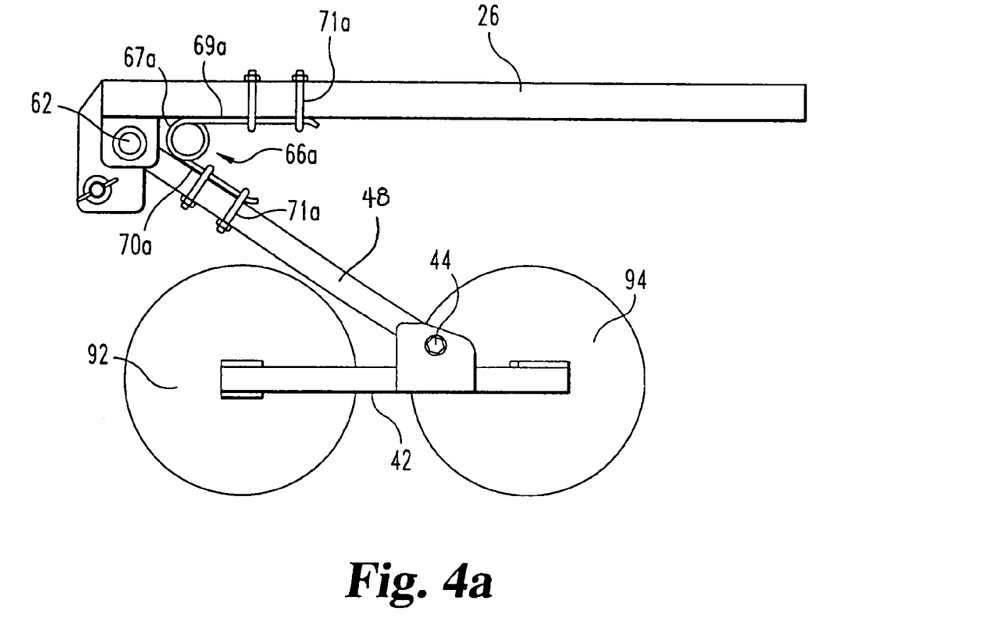
FIGS. 4a and 4b are side views illustrating alternate embodiments of the spring suspension for the walking beam assembly illustrated in FIG. 4.
Figure 4B:
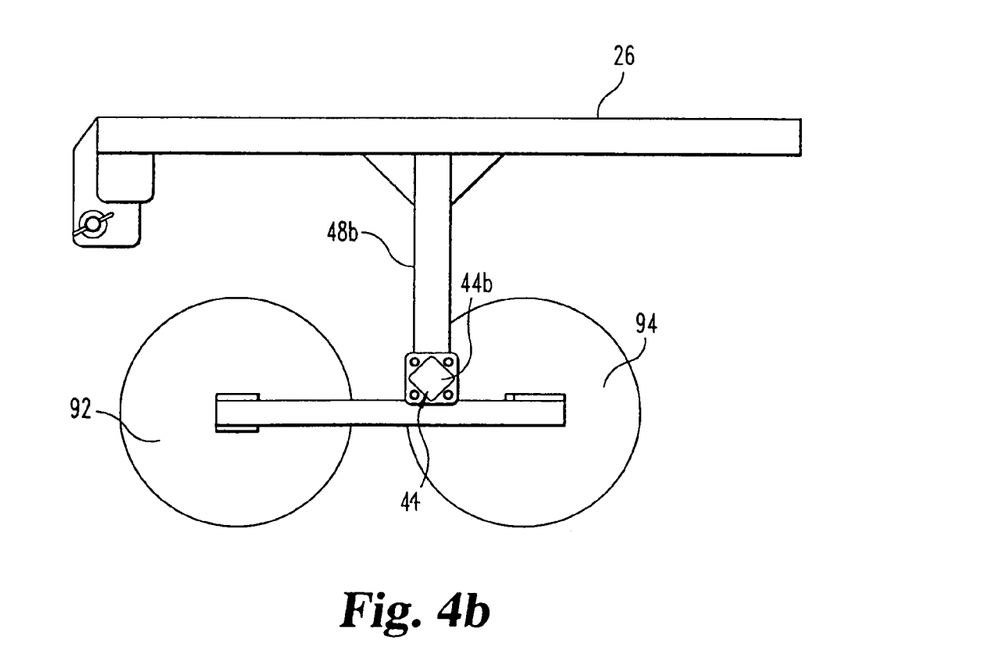

Of course, while spring member 66 is illustrated herein as a mechanical coil spring in FIG. 4, one of skill in the art would readily recognize various alternatives for the spring member, such as hydraulic or compressed air cylinders, leaf springs and many others. In FIG. 4a, for example, spring member 66 has been replaced by a coil spring 66a that includes a coil 67a having legs 69a and 70a attached to frame 26 and arm member 48, respectively, by bolt members 71a. While not preferred, the disk assembly may be attached to frame 26 by a rigid arm member 48b as shown in FIG. 4b, and the disks pivot about torsion bar 44b disposed about pivot point 44.

Figure 5:
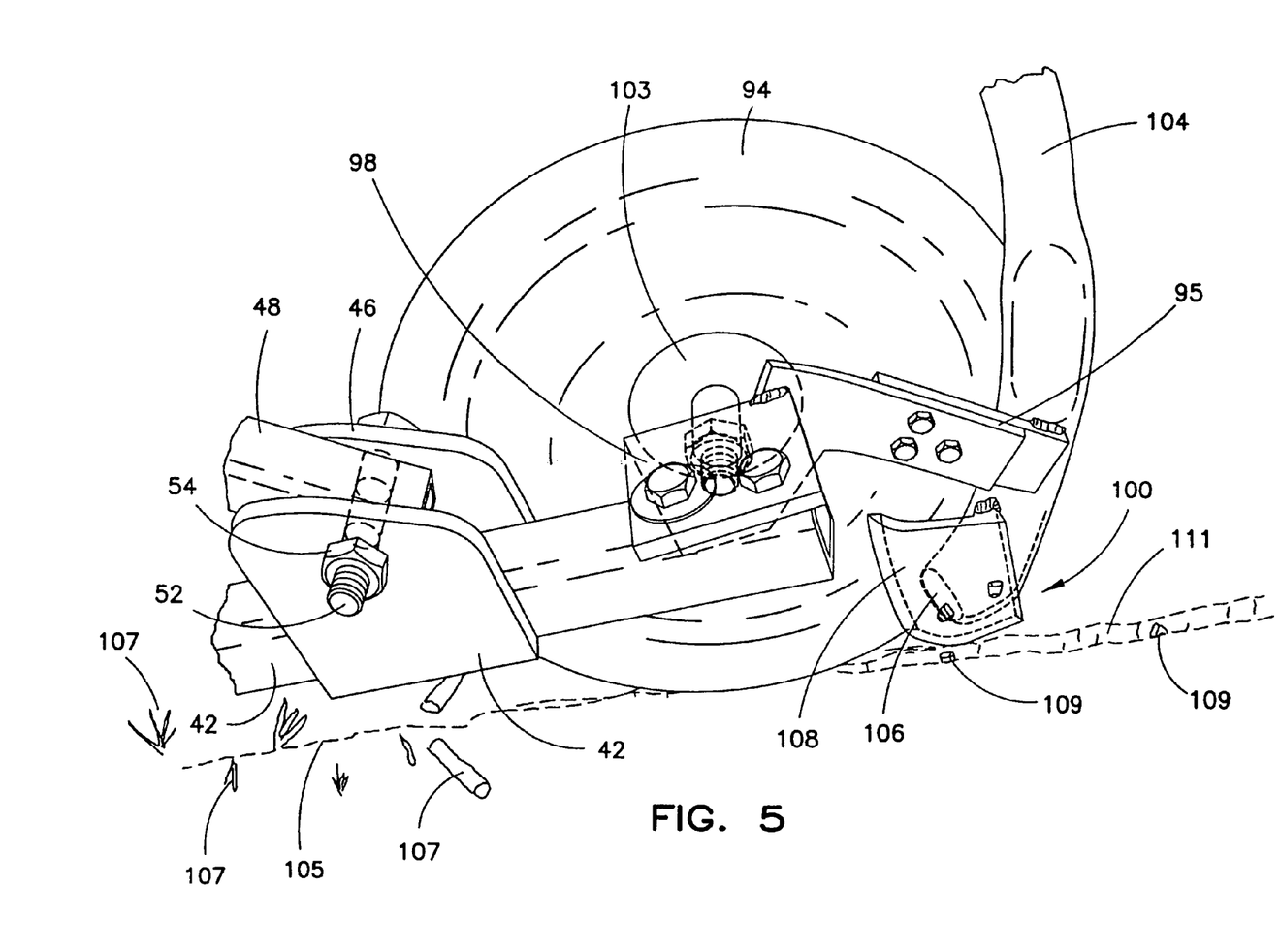
FIG. 5 is a fragmentary perspective view of an opening disk with a seed chute mounted thereto, illustrating the forming of a furrow and the depositing of seed therein.

With reference to FIGS. 2 and 4, a cutting disk 92 and an opening disk 94 are rotatably mounted to opposite ends of walking beam 42 and are positioned adjacent one another. The cutting disk 92 cuts through vegetation and other trash, clearing a path for opening disk 94. Opening disk 94 forms a furrow or trench in which seed is deposited. Thereafter, closing disk 40 rolls over the furrow and closes it. As shown in FIGS. 2 and 5, walking beam 42 includes plates 96 and 98 attached to opposite ends by means of welding for plate 96 and bolts 99 for plate 98. Depending downwardly from the plates are tabs or ears 97 that receive the threaded ends 101 of disk bearings 103 as shown. The method and apparatus for rotatably mounting the disks to the ends of walking beam 42 are well known in the art and the means employed is not particularly important as pertains to the present invention. As walking beam 42 pivots about pivot point 44, one of the disks 92 and 94 moves upward and the other moves downward relative to pivot point 44. Pivotal movement of arm member 48 about pivot point 58 causes vertical displacement of walking beam 42 relative to frame 26. While the illustrated embodiment includes a cutting disk and an opening disk, it should be appreciated that the inventive walking beam assembly could be employed with a virtually limitless variety of disk pairs that perform various functions. The advantages of the inventive walking beam assembly 24 are described below with respect to its operation.

With reference to FIGS. 2 and 5, opening disk 94 includes a seed dispenser 100 adjacent thereto. Dispenser 100 is attached to walking beam 42 by plate 95 and includes a flexible tube 102 that connects with a fixed tube 104 having an opening 106 at its terminal end. A scraper plate 108 is welded to tube 104 and scrapes dirt and debris from disk 94 as the drill moves forwardly. As shown in FIG. 5, seed 109 is ejected in the direction of travel (i.e., seed chute 104 is angled toward cutting disk 92) into furrow 111 immediately after the furrow is formed. As shown on the left hand side of disk 94 in FIG. 5, a cut 105 through debris 107 is made by cutting disk 92, thus clearing the way for disk 94 to form furrow 111. Under the conventional wisdom, the seed chute is pointed in a direction opposite the direction to travel, leaving ample time for the opening disks to fully form their furrows before seed is deposited in them. The present invention goes directly against the conventional wisdom in this regard. Nonetheless, the inventors of the present invention have found that pointing the seed chute in the direction of travel provides an excellent seed bed.

Figure 3:
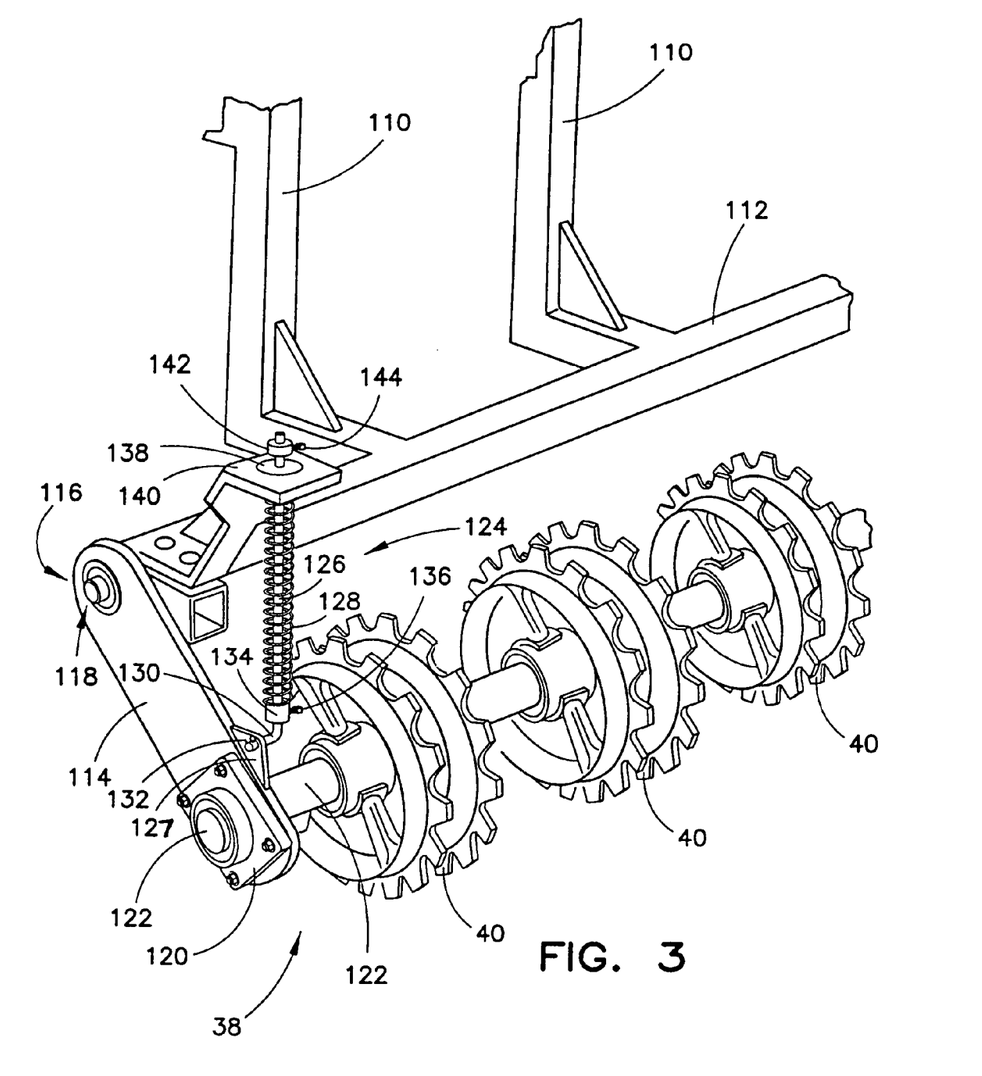
FIG. 3 is an enlarged fragmentary perspective view of the closing disk assembly of the no-till drill shown in FIG. 1.

With reference to FIGS. 1 and 3, seed drill 20 includes a closing disk assembly 38 having closing disks 40 suspended from frame 26 by a closing disk suspension that includes frame members 110 and cross member 112. An arm member 114 is pivotably attached to cross member 112 by bearing assembly 116, the center of which forms a pivot point 118. At the lower end of arm member 114 is disposed a bearing assembly 120 that rotatably receives shaft 122 on which wheels or closing disks 40 are fixedly mounted such that their rotation causes shaft 122 to rotate therewith, thus driving drive train 30 and the seed metering system in the seed hopper, as described above.

A spring member 124 is attached to arm member 114 at its lower end and extends through an opening in support plate 140 at its upper end. Like spring member 66 discussed above, spring member 124 includes a rod member 126 that is fed through spring 128. Spring member 124 is but one of many various alternatives for the spring member that would be recognized by one of ordinary skill in the art. Rod 126 is made of cylindrical steel stock and has an angled end 130 that is received through a hole formed in tab 127. End 130 is secured by a cotter pin 132 as shown. The bottom end of spring 128 abuts against moveable sleeve or collar 134 that has a threaded opening for a set screw 136. As further shown in FIG. 3, spring 128 abuts and is biased against bushing 138 that is attached to plate 140. The downward displacement of rod member 126 is limited by the position of movable collar 142 having set screw 144. The downward pressure or force exerted upon closing disk assembly 38 is normally controlled by adjusting the position of collar 134.

Top limiting collar 142 is typically used to prevent the closing disk assembly 38 from travelling too far downward when drill 20 is raised from the ground, such as, e.g., when it is being transported or turned, but not during normal operation. When drill 20 is lowered into its operating position for drilling and planting, spring 128 is under compression, being held in place by lower locking collar 134. When lowered, collar 142 is free to move and does not bear the weight of closing disk assembly 38. The downward force exerted by closing disk assembly 38 is therefore controlled by the position of collar 134. Advantageously, the adjustment of collar 134 also acts as a secondary or auxiliary depth control for the disks 92 and 94.

A preferred feature of the illustrated embodiment is that all closing disks move up and down relative to frame 26 as a single unit because all closing disks 40 are rotatably mounted about a single rotational axis, namely, shaft 122. This helps maintain better closing force to disks 40. Additionally, having all of the closing disks on a single axis generally makes the secondary depth control just noted more consistent and easily adjustable, as opposed to individually adjustable opener systems or opener systems that are not adjustable. Nonetheless, for some applications, it may be preferable to arrange the closing disks such that they displace vertically independently of one another, such as when the terrain varies greatly in a direction across drill 20.

An important feature of the present invention is that the closing disk assembly 38 is suspended from the frame independently of the walking beam assemblies 24. This allows the cutting disks 92 and opening disks 94 to maintain substantially constant contact with the ground when drill 20 is crossing severely uneven terrain or other obstacles. In other words, if the closing disks were mounted to walking beam 42, for example, when crossing uneven terrain, one disk would frequently lose contact with the ground and thereby miss performing its respective function on a section of ground.

For the particular disks employed with the illustrated embodiment, namely cutting and opening disks 92 and 94, it is necessary to apply more downward force to the opening disks 94 than the cutting disks 92. With reference to FIG. 4, cutting disk 92 and opening disk 94 define a vertical axis 150 midway therebetween. However, the downward force provided by spring member 66 is applied to pivot point 44, which is offset from the center of walking beam 42 or vertical axis 150 and is instead located closer to opening disk 94 than cutting disk 92. The offset geometry can be appreciated by observing that pivot point 44 is disposed within a radial periphery defined by disk 94. Pivot point 44 extends through vertical axis 152, which is offset from axis 150 as shown. Thus, spring member 66 transmits a greater portion of its downward force to disk 94 than disk 92 by virtue of the offset pivot point 44.

As alluded above, the principles that can be gleaned from the illustrated embodiment can be employed in numerous ways not specifically mentioned or illustrated herein and yet remain within the scope of the present invention. For example, in some applications, the front disk may be performing more work and may require greater downward force than the rear disk, in which event the pivot point could be moved forwardly on the walking beam. In other situations, equal downward force to the disks may be preferred, in which event the pivot point could be disposed centrally with respect to the walking beam.

Pivot point 58 of arm member 48 is positioned not only forward of vertical axis 150, but forward of the center of disk 92. This forward placement results in arm member 48 being disposed at an acute angle relative to walking beam 42, and this acute angle varies with pivotal movement of arm member 48 about pivot points 44 and 58. This configuration provides a wide suspension for walking beam 42 and fosters stability by minimizing lateral forces exerted on spring member 66 from the pivoting of arm member 48 about frame 26. Placing pivot point 58 forward of disk 92 also allows unencumbered movement of arm member 48, which in turn prevents arm member 48 from impeding vertical displacement of walking beam 42 relative to frame 26.

With reference to FIG. 1, drill 20 of the illustrated embodiment includes four walking beam assemblies spaced about axis 25, which is transverse to the direction of travel 21 of seed drill 20. Each of the walking beam assemblies on drill 20 includes the same or similar components, and in preferred embodiments, the separate walking beam assemblies are independently suspended from frame 26. Depending upon the particular application for which drill 20 is designed, it can have more or less than the four walking beam assemblies illustrated herein. Further, the spacing of the walking beam assemblies about transverse axis 25 is another design variable that depends upon the application. Of course, the width or overall size chosen for drill 20 may also affect the number of walking beam assemblies.

Figure 6B:
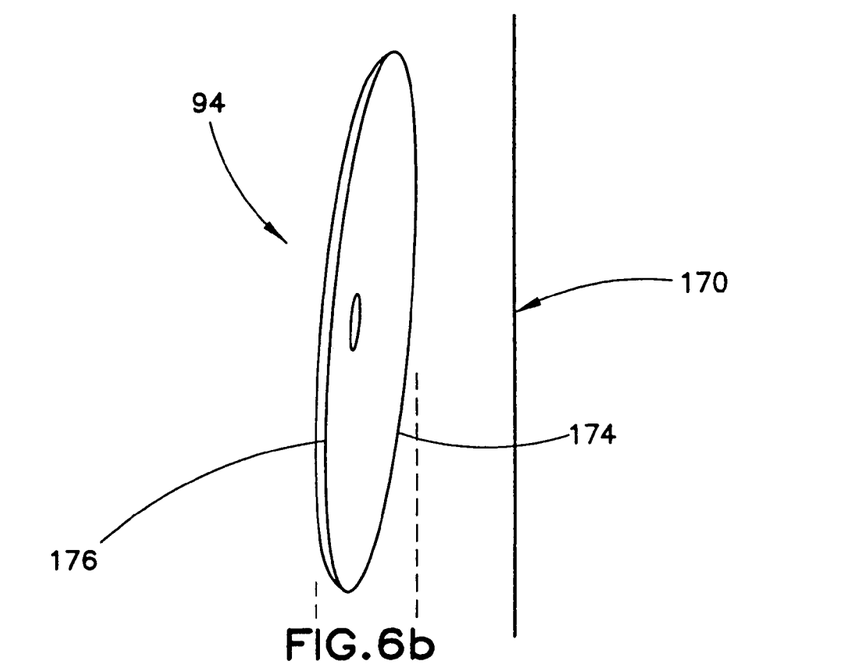
FIGS. 6b and 6c are side and top views taken along lines 6b—6b and 6c—6c of FIG. 6a, respectively, of an opening disk in accordance with an embodiment of the present invention.

Turning now to FIG. 6a, a vertical axis 170 bisects drill 20. The cutting disks 92 on each side of axis 170 are aligned with the direction of travel and are essentially parallel to axis 170. By contrast, the opening disks 94 on both sides of axis 170 have concave surfaces 171 that face axis 170, and disks 94 are also angled in two directions. As shown in FIG. 6b, disk 94 is tilted such that the top portion thereof leans toward central axis 170. Tilting disks 94 allows the cutting edge of the concave shaped disks to more directly cut into the ground to be tilled, thereby improving their cutting efficiency.

Figure 6C:
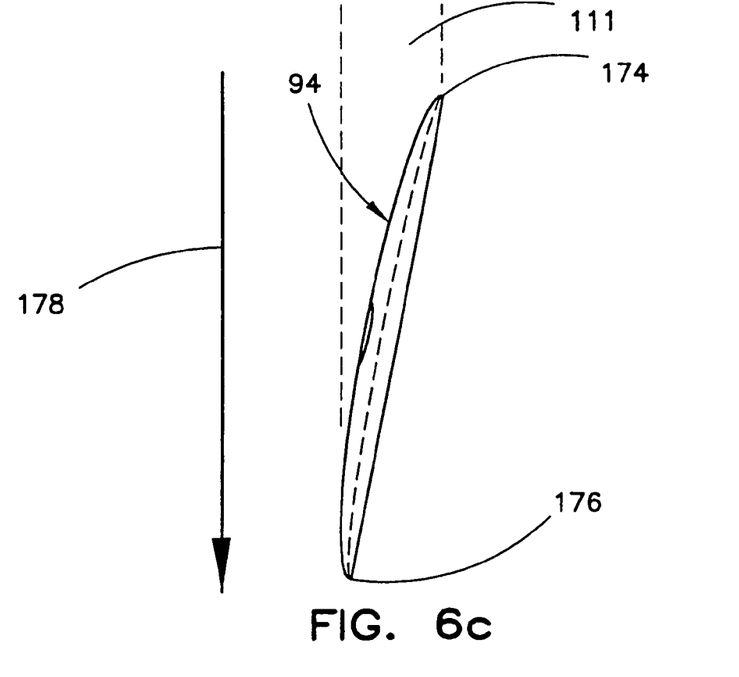

Disk 94 is also angled such that its trailing edge 174 is closer to axis 170 than its leading edge 176. That is, it is angled with respect to the direction of travel, as can be seen with reference to FIG. 6c, in which arrow 178 represents the direction of travel. Angling disks 94 relative to the direction of travel as shown in FIG. 6c provides a wider furrow 111 than would be obtained were the disks not angled. The greater the extent the disks are angled, the wider the furrow made by disks 94. Of course, it should be understood that the angling of the opening disks is a preferred feature of the illustrated embodiment. Other walking beam assemblies using the principles of the present invention may include disks angled to a different degree or not at all.

The concave disks 94 exert a lateral force on drill 20 as it is moved. To avoid these lateral forces from accumulating and causing the drill to "pull" to one side or the other, the disks are positioned such that they are symmetric about the central vertical axis 170 of drill 20 as shown in FIG. 6a, i.e., the disks on either side of axis 170 face one another. This symmetry tends to cause the lateral forces to cancel one another, avoiding undesirable lateral pulling.

Figure 7A:
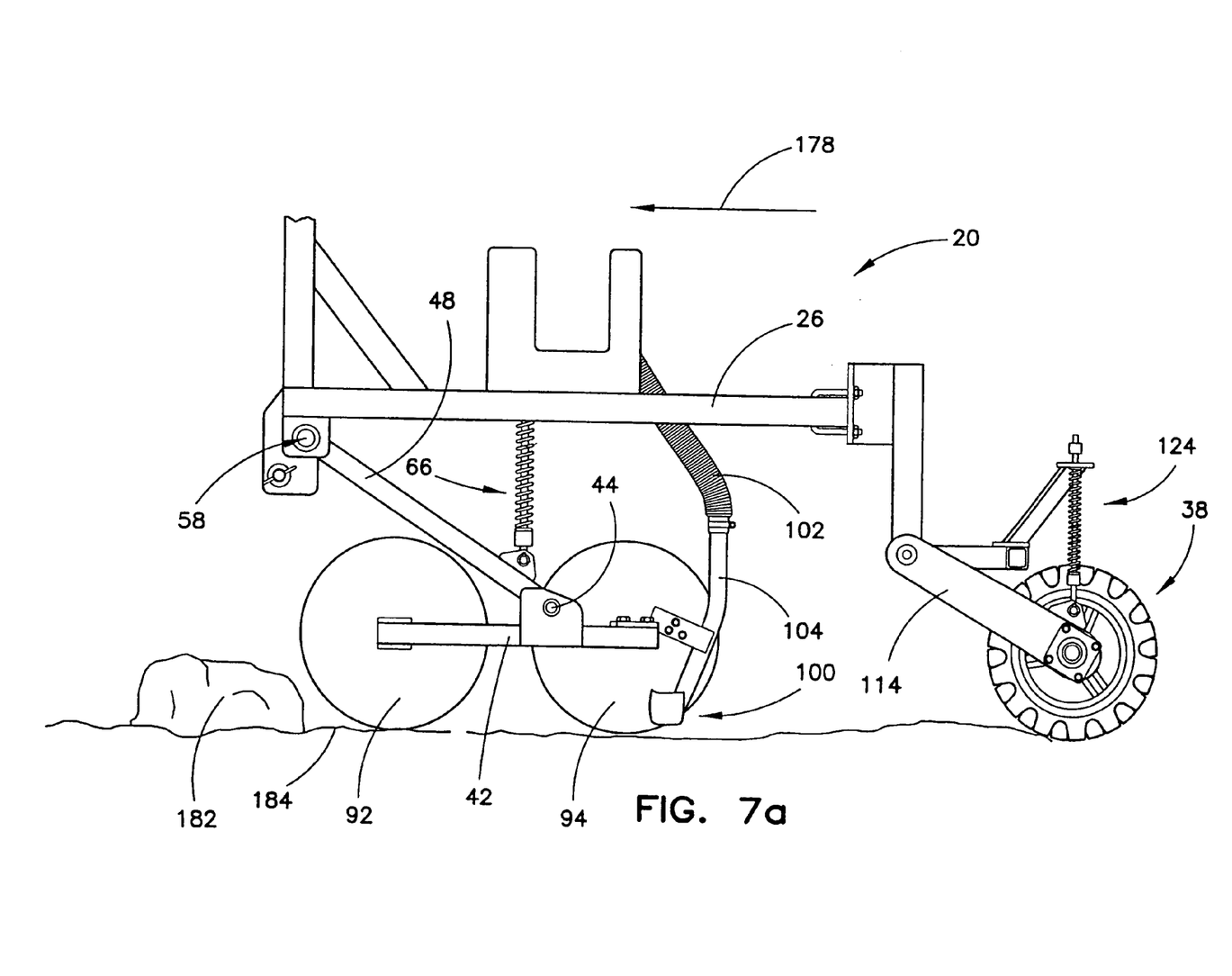
FIGS. 7a–7c are sequential side views illustrating a walking beam assembly crossing over a rock.
Figure 7B:
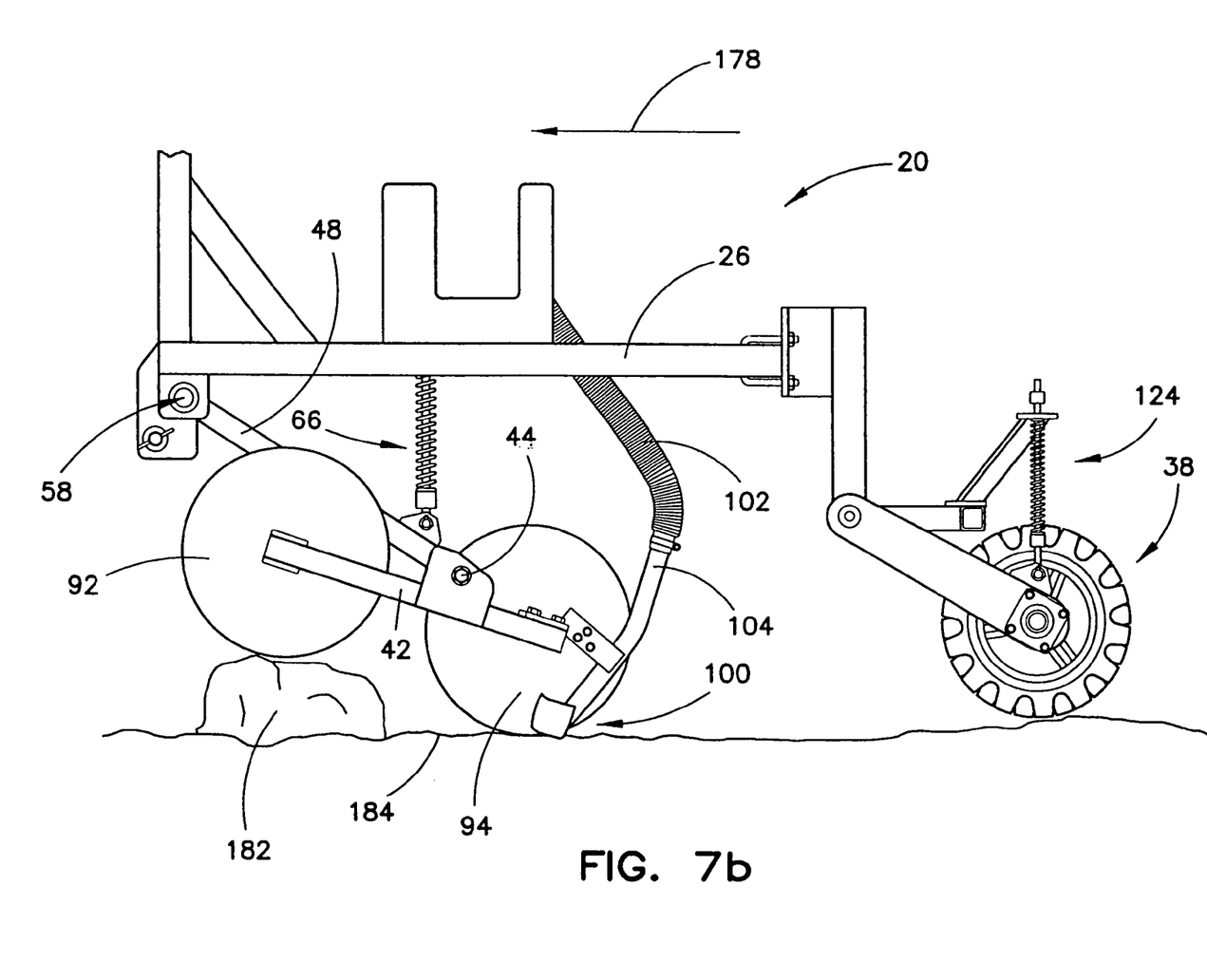
Figure 7C:
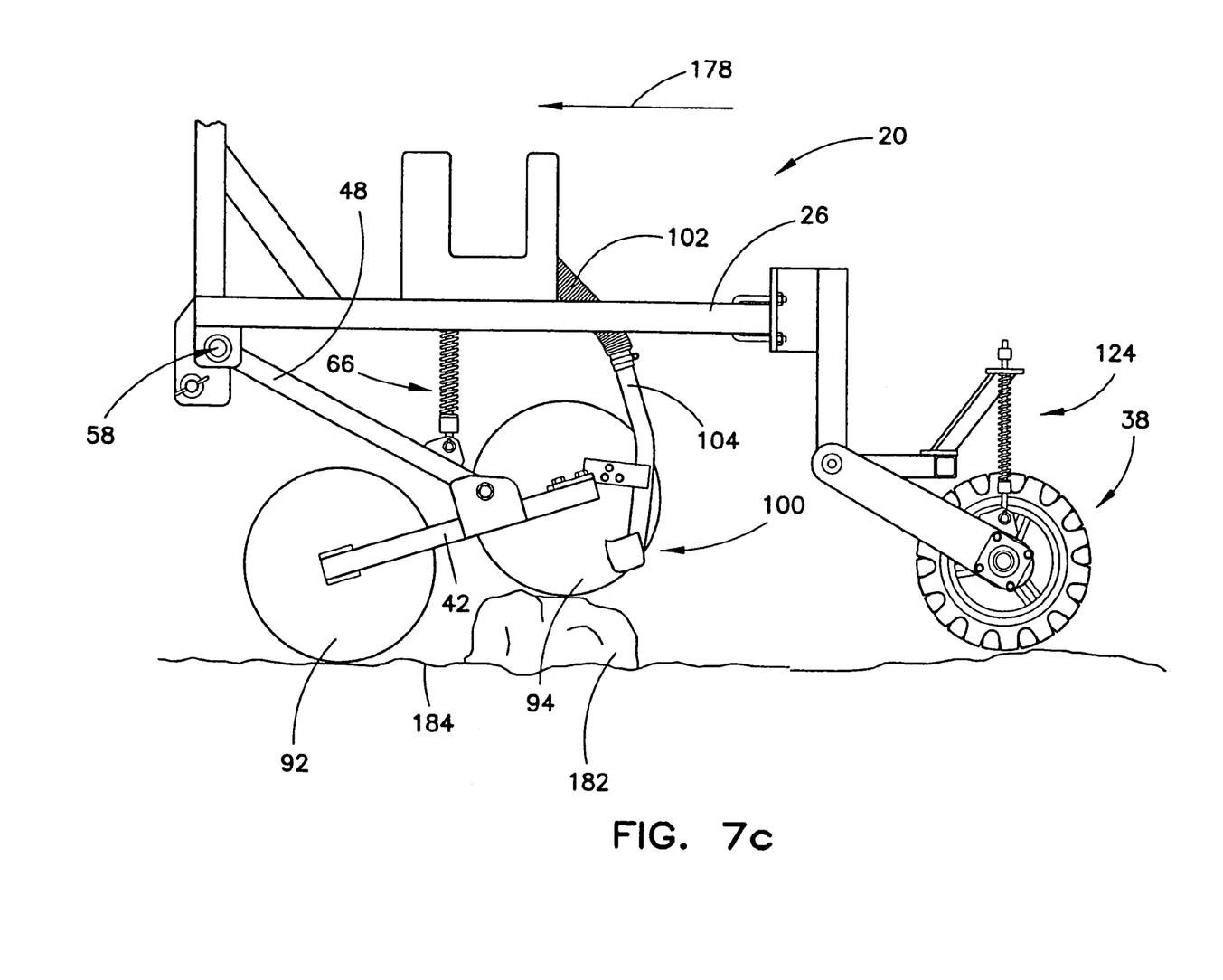

With reference to FIGS. 7a–7c, the operation of drill 20 over uneven terrain can be appreciated. The direction of travel of drill 20 is as shown by arrow 178. Walking beam 42 is provided with disks 92 and 94 rotatably mounted to opposite ends thereof, as discussed above. Walking beam 42 is typically aligned with and then moved along the direction of travel 178. As forward motion proceeds, the walking beam 42 is permitted to pivot about pivot point 44 as disk 92 encounters uneven terrain as a result of boulder or rock 182 as shown in FIG. 7b. Advantageously, however, disk 94 maintains substantially constant or continuous contact with the ground even though disk 92 is significantly displaced by rock 182, and the furrow so formed thus extends very close to rock 182.

As shown in FIG. 7c, disk 92 has returned to its "cutting position" against ground 184 almost immediately after crossing rock 182 to continue its function of cutting away trash and vegetation. Meanwhile, opening disk 94 is displaced by rock 182. Importantly, the inventive walking beam assembly is also able to move vertically, namely, through the pivoting of arm member 48 about pivot point 58. Thus, even if an obstruction such as rock 182 were to displace both disks 92 and 94 simultaneously, the walking beam could continue forwardly without either disk losing contact with the ground. Instead, the walking beam assembly would displace upwardly against the force of spring member 66. In fact, walking beam 42 is shown displaced vertically upward in FIG. 6b and to a greater extent in FIG. 6c. This vertical displacement happens simultaneously with and in addition to the walking beam pivoting about point 44. It can now be appreciated that the inventive method disclosed herein maximizes the length of furrows to be formed and filled because interference from the uneven terrain is minimized.

While a preferred embodiment incorporating the principles of the present invention has been disclosed hereinabove, the present invention is not limited to the disclosed embodiments. Instead, as noted above, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seed drill, comprising:
a frame;

a walking beam suspended from the frame and pivotable about a first pivot point;

a spring member connecting the walking beam to the frame and movably biasing the walking beam downward relative to the frame;

a first disk and a second disk rotatably mounted to opposite ends of the walking beam and positioned adjacent one another, the first and the second disks being positioned on opposite sides of the first pivot point; and an arm member having a first portion pivotably attached to the walking beam at the first pivot point and a second portion pivotably attached to the frame at a second pivot point, wherein pivotal movement of the walking beam about the first pivot point causes upward movement of one of the first and second disks and downward movement of the other of the first and second disks relative to the first pivot point, and further wherein pivotal movement of the arm member about the second pivot point causes vertical displacement of the walking beam relative to the frame.

2. A seed drill, comprising:

a frame;

a walking beam suspended from the frame and pivotable about a first pivot point;

a spring member connecting the walking beam to the frame and movably biasing the walking beam downward relative to the frame; and a first disk and a second disk rotatably mounted to opposite ends of the walking beam and positioned adjacent one another, the first and the second disks being positioned on opposite sides of the first pivot point;

wherein the first pivot point is offset from the center of the walking beam and is located closer to the second disk than the first disk, wherein the spring member transmits downward force to the walking beam at a point proximate the first pivot point, whereby a greater portion of the downward force is transmitted to the second disk than the first disk.

3. A seed drill, comprising:

a frame;

a walking beam suspended from the frame and pivotable about a first pivot point;

a first disk and a second disk rotatably mounted to the walking beam and positioned on opposite sides of the first pivot point; and a closing disk suspended from the frame by a closing disk suspension, the closing disk being suspended from the frame independently of the walking beam;

wherein the first pivot point is offset from the center of the walking beam and is located closer to the second disk than the first disk, wherein the spring member transmits downward force to the walking beam at a point proximate the first pivot point, whereby a greater portion of the downward force is transmitted to the second disk than the first disk.

4. A seed drill, comprising:

a frame;

a walking beam having a first disk and a second disk rotatably mounted thereto, the walking beam defining a first pivot point between the first disk and the second disk;

an arm member having a first portion pivotably attached to the walking beam at the first pivot point and a second portion pivotably attached to the frame at a second pivot point;

wherein pivotal movement of the walking beam about the first pivot point causes upward movement of one of the first and second disks and downward movement of the other of the first and second disks relative to the first pivot point;

further wherein pivotal movement of the arm member about the second pivot point causes vertical displacement of the walking beam relative to the frame; and a spring member connecting the frame and the walking beam and biasing the walking beam vertically downward relative to the frame, wherein the first pivot point is offset from the center of the walking beam and is located closer to the second disk than the first disk, wherein the spring member transmits greater downward force to the second disk than the first disk.

5. The seed drill of claim 4, wherein the first pivot point is disposed within a radial periphery defined by the second disk.

6. A seed drill, comprising:

a frame;

a walking beam having a first disk and a second disk rotatably mounted thereto, the walking beam defining a first pivot point between the first disk and the second disk;

an arm member having a first portion pivotably attached to the walking beam at the first pivot point and a second portion pivotably attached to the frame at a second pivot point;

wherein pivotal movement of the walking beam about the first pivot point causes upward movement of one of the first and second disks and downward movement of the other of the first and second disks relative to the first pivot point; and further wherein pivotal movement of the arm member about the second pivot point causes vertical displacement of the walking beam relative to the frame;

wherein the first disk and the second disk define a vertical axis midway therebetween, the first pivot point being positioned between the center of the second disk and the vertical axis and the second pivot point being positioned forward of the vertical axis.

7. The seed drill of claim 6, wherein the second pivot point is positioned forward of the first disk.

8. A method of forming a furrow in uneven terrain, comprising:

(a) providing a walking beam having a first disk and a second disk rotatably mounted to opposite ends thereof;

(b) aligning the walking beam along a direction of travel and moving the walking beam forwardly along the direction of travel over the uneven terrain while allowing the uneven terrain to pivot the walking beam about a pivot point located between the first and second and (c) applying downward force to the walking beam at the pivot point and thereby maintaining both the first disk and second disk in substantially constant contact with the uneven terrain, thereby forming the furrow; and wherein the pivot point is offset from the middle of the walking beam and is closer to the second disk than the first disk, whereby a greater portion of the downward force is applied to the second disk than the first disk.

* * * * *

UNITED STATES PATENT AND TRADEMARK OFFICE
CERTIFICATE OF CORRECTION

| | | |
|---|---|---|
| PATENT NO. | : 7,044,070 B2 | Page 1 of 1 |
| APPLICATION NO. | : 10/772609 | |
| DATED | : May 16, 2006 | |
| INVENTOR(S) | : Kaster et al. | |

It is certified that error appears in the above-identified patent and that said Letters Patent is hereby corrected as shown below:

Column 10,
Line 56, change "a pivot point located between the first and second and" to
-- a pivot point located between the first and second disks; and --.

Signed and Sealed this

Fourth Day of July, 2006

JON W. DUDAS
*Director of the United States Patent and Trademark Office*